UNITED STATES PATENT OFFICE.

GEORGE HALE BRABROOK, OF TAUNTON, MASSACHUSETTS.

PROCESS FOR MAKING MOLDS FOR METAL CASTINGS.

984,469.  Specification of Letters Patent.  Patented Feb. 14, 1911.

No Drawing.  Application filed June 6, 1908.  Serial No. 437,079.

*To all whom it may concern:*

Be it known that I, GEORGE HALE BRABROOK, citizen of the United States, residing at Taunton, in the county of Bristol and State of Massachusetts, have invented a certain new and useful Improvement in Processes of Making Molds for Metal Castings, of which the following is a specification.

My invention has for its object to produce a mold for the manufacture of castings, and particularly for the manufacture of castings of a delicate nature and having fine lines and ornamentations upon their surfaces.

The invention will be fully understood from the following description and the novel features thereof will be pointed out and clearly defined in the claims at the close of the specification.

In manufacturing molds in accordance with my invention I take a sheet of moist asbestos of the desired thickness and place it upon the pattern and ram or pack the moist asbestos in the interstices of the said pattern with a stereotyper's brush or similar tool, or in any other convenient manner, until the perfect mold is obtained, after which the mold is removed from the pattern, or if more convenient, the mold may be partially dried upon the pattern under pressure. I then apply to the surface of the mold a facing material of some suitable kind and replace the mold upon the pattern and ram it again, thereby causing the facing material to take the impression of the pattern, so that the mold is left with a smooth, almost polished, surface which is free from disturbed fibers and unevennesses.

The asbestos which I use is preferably the ordinary asbestos paper of commerce and which I believe to be made of asbestos fiber held together with sizing or paste or other suitable binding material and having also possibly a filling of clay or similar material. I do not, however, consider the presence of the binding or filling material as essential since I believe the asbestos fiber alone might be used. When asbestos fiber is employed, it is formed into a moist mass or pulp and a layer of sufficient thickness is applied to the pattern under pressure. I take a number of these sheets and moisten them and paste the proper number of sheets together to form a mass of any desired thickness.

The application of the facing material to the asbestos mass may be made before the mass is placed upon the pattern and rammed if preferred. In practice I find it best to use the facing material in the manner described in my application for process of molding, filed November 9, 1904, Serial No. 232,059. In the process there described I apply a facing composed of some suitable incombustible and non-fusing facing material such as German or French burnt sand in the form of an impalpable powder and capable of withstanding a high degree of heat mixed with a volatile liquid hydrocarbon, preferably benzin, non-mixable with water. The said facing material and volatile liquid are preferably mixed together in the proportions of one-third of a pint of the facing material to one pint of the liquid, and this mixture is then sprayed or otherwise applied to the surface of the asbestos in a thin paste or semi-plastic condition, so as to fill in the interstices of the surface of the mold and form a skin or layer on said surface. The benzin may be modified to cause it to evaporate more slowly, or it may be, if desired, rendered non-inflammable by the mixture of a proper proportion of tetra-chlorid of carbon. After the facing material has been applied to the asbestos mass, the said mass is placed upon the pattern and rammed after which the asbestos mold thus obtained is dried or baked.

In the case of very deep ornamentation, the following method of applying the facing material may be employed. First, face the asbestos, then ram on the pattern and should the high and deep points break through the facing, a further application of the facing material may be made and another ramming on the pattern effected.

I am aware that it has been hitherto proposed to face asbestos stereotype matrices with plant glue. Such a mold will not, however, answer the purposes for which my mold is intended since the facing would not withstand any considerable degree of heat and would, therefore, be wholly unfit for the casting of metals commonly employed in the production of high grade castings having fine ornamentation thereon. The facing material which I employ is a powder characterized generally as infusible and incombustible. I do not, however, wish to limit myself to the use of any particular infusible and incombustible powdered facing material.

What I claim is:

1. The process of making a mold for metal castings consisting of compressing a moist sheet of asbestos upon a pattern of the article to be cast, applying to the inner face of the asbestos mold thus shaped, while still wet, a facing of finely powdered material and compressing the same to form a smooth compact facing for the mold, then drying the mold thus faced.

2. The process of making a mold for metal castings consisting of shaping a mass of moist asbestos to the pattern of the article to be cast and providing the inner face of the mold thus shaped, while still wet, with a facing of powdered material other than asbestos and then drying the mold.

3. The process of making a mold for metal castings consisting of forming the body of the mold of asbestos, shaping it while moist on the pattern of the article to be cast, and providing the inner face of the asbestos mold thus formed with an inner facing of finely powdered non-fusible material other than asbestos mixed with a volatile liquid not mixable with water.

4. The process of making a mold for metal castings consisting of compressing a sheet of moist asbestos upon a pattern of the article to be cast and providing the inner face of the asbestos mold thus shaped with a facing of suitable material mixed with a volatile liquid not mixable with water and then drying the mold.

5. The process of making a mold for metal castings consisting of shaping under compression a sheet of moist asbestos on a pattern of the article to be cast and providing the inner face of the asbestos mold thus shaped with a facing of suitable material and compressing the same thereon, then drying the faced mold.

6. The process of making a mold for metal castings consisting of shaping moist asbestos to the pattern of the article to be cast and providing the inner face of the mold, while still wet, with a facing of finely powdered non-fusible material.

7. The process of making a mold for metal castings by inserting between the pattern and a sheet of moist asbestos finely powdered material to form a facing, compressing the whole mass while still wet upon the pattern and drying the mold.

8. The process of making a mold for metal castings by inserting between the pattern and a sheet of moist asbestos a suitable material mixed with a volatile liquid non-mixable with water, compressing the whole mass while still wet upon the pattern and drying the mold.

In testimony whereof I affix my signature, in presence of two witnesses.

GEORGE HALE BRABROOK.

Witnesses:
WM. A. MACLEOD,
ALICE H. MORRISON.